(12) United States Patent
John et al.

(10) Patent No.: US 7,654,445 B2
(45) Date of Patent: Feb. 2, 2010

(54) SYSTEM AND METHOD FOR REVENUE AND EXPENSE REALIGNMENT

(76) Inventors: Christopher Michael John, 7 Cherry Tree Dr., Norton, MA (US) 02766; Kleber Santiago Gallardo, 8 Turning Mill Rd., Lexington, MA (US) 02420

( * ) Notice: Subject to any disclaimer, the term of this patent is extended or adjusted under 35 U.S.C. 154(b) by 466 days.

(21) Appl. No.: 11/300,028

(22) Filed: Dec. 14, 2005

(65) Prior Publication Data
US 2007/0150384 A1 Jun. 28, 2007

(51) Int. Cl.
*G06F 17/00* (2006.01)
(52) U.S. Cl. ............... 235/375; 707/10; 707/102; 709/217
(58) Field of Classification Search ............... 705/28, 705/30; 235/375; 707/10, 100, 102, 104.1; 709/217
See application file for complete search history.

(56) References Cited

U.S. PATENT DOCUMENTS

| | | | |
|---|---|---|---|
| 5,845,283 A * | 12/1998 | Williams et al. ........... 707/101 |
| 5,875,435 A * | 2/1999 | Brown ......................... 705/30 |
| 6,058,375 A * | 5/2000 | Park ............................ 705/30 |
| 6,128,602 A * | 10/2000 | Northington et al. ......... 705/35 |
| 6,170,030 B1 * | 1/2001 | Bell ............................. 710/310 |
| 6,381,587 B1 * | 4/2002 | Guzelsu ....................... 705/40 |
| 6,466,969 B1 * | 10/2002 | Bunney et al. ............... 709/206 |
| 6,856,970 B1 * | 2/2005 | Campbell et al. ............ 705/35 |
| 6,904,411 B2 * | 6/2005 | Hinkle ......................... 705/35 |
| 7,139,729 B2 * | 11/2006 | Nault ........................... 705/30 |
| 7,165,044 B1 * | 1/2007 | Chaffee ....................... 705/37 |
| 7,177,825 B1 * | 2/2007 | Borders et al. ............... 705/26 |
| 7,181,422 B1 * | 2/2007 | Philip et al. ............... 705/36 R |
| 7,236,950 B2 * | 6/2007 | Savage et al. ................ 705/34 |
| 7,240,028 B1 * | 7/2007 | Rugge ......................... 705/30 |
| 7,249,138 B1 * | 7/2007 | Wasserman ................. 707/102 |
| 7,321,869 B1 * | 1/2008 | Phibbs, Jr. ................... 705/30 |
| 7,325,027 B2 * | 1/2008 | Grow et al. .................. 709/201 |
| 7,343,385 B2 * | 3/2008 | Lusen et al. ............... 707/104.1 |
| 7,349,875 B1 * | 3/2008 | Hood et al. .................. 705/35 |
| 7,392,934 B2 * | 7/2008 | Hahn-Carlson et al. ..... 235/379 |
| 7,518,500 B2 * | 4/2009 | Aninye et al. ............... 340/506 |

OTHER PUBLICATIONS

PCT Notification of Transmittal of the International Search Report and the Written Opinion of the International Searching Authority, or the Declaration, International Application No. PCT/US06/47809, International Filing Date Dec. 14, 2006, date of mailing: Aug. 14, 2008, 9 pages.

* cited by examiner

*Primary Examiner*—Andrew Joseph Rudy
(74) *Attorney, Agent, or Firm*—Cesari and McKenna, LLP

(57) ABSTRACT

A system and method for revenue and expense realignment is provided. A revenue and expense realignment application (RECAST) comprising of a rules engine executing on a computer receives revenue and/or expense transactions. At predetermined time intervals, the RECAST executes a series of steps, each of which has one or more user defined rules associated therewith to transform inbound transactions. The transformed transactions are then posted to other applications including, for example, a general ledger.

11 Claims, 12 Drawing Sheets

SYSTEM AND METHOD FOR REVENUE AND EXPENSE REALIGNMENT

BACKGROUND OF THE INVENTION

1. Field of the Invention

The present invention relates to accounting systems and, more particularly, to a system and method for revenue and expense realignment.

2. Background Information

Accounting within a business entity of any appreciable size is a complex operation. The business entity typically maintains a general ledger showing all of the transactions conducted by the various organizational units of the business enterprise. One or more revenue sources, which may be divisions, sales offices, individual salesmen, etc., generate revenue transactions that are stored within the general ledger. Similarly, one or more expense sources generate expense transactions showing various expenses related to the business enterprise. Typically, the plurality of revenue and/or expense transactions is are stored within the general ledger as individual entries. A noted problem with conventional business accounting systems is that there exists no easy technique for retrieving certain types of information from the general ledger. Individual entries within the general ledger may be retrieved, however, assimilating the data into a meaningful representation to answer common accounting and/or business-related questions may be complicated and/or impossible, depending upon at what granularity the revenue and expense sources output transactions.

A further noted disadvantage of conventional accounting systems is that data may be output from the various revenue and/or expense sources utilizing levels of granularity different than what is desired by users of the accounting system. For example, revenue may be output on a per product basis; however, the business entity may desire to a apportion the revenue from a particular product among several constituent elements of the business entity, e.g., between two divisions and/or between two salespeople. To track such information, the business entity may be required to keep multiple sets of books and associated revenue/expense sources for each level of granularity at which information may be desired. Such a redundant system introduces obvious cost increases with a concomitant increase in problems of data security and consistency. Additionally, users of the general ledger are typically limited by the static configuration of the revenue/expense sources and the type of information that they export.

SUMMARY OF THE INVENTION

The present invention overcomes the disadvantages of the prior art by providing a system and method for revenue and expense realignment that includes a user configurable rules engine that implements a series of rule based steps to transform, augment, multi-level aggregate and/or multi-level apportion inbound revenue and/or expense transactions before posting to the general ledger. A revenue and expense tracking system (RECAST) executes on a computer within a network operatively interconnected to one or more transaction servers, which illustratively generate revenue and/or expense transactions.

The RECAST illustratively comprises a plurality of modules including inbound and outbound interface modules that convert incoming data to/from a universal transaction format (UTF) that is utilized by the RECAST. The RECAST also includes a user interface (UI) module and associated statement builder module that permit a user to generate IF/THEN/ELSE logical statements as rules for processing received transactions. A user of the RECAST may access the UI via a web browser to configure appropriate data mappings, data sources, define one or more rules and one or more steps to be executed by the RECAST rules engine.

A rules engine of the RECAST executes the series of the rule based steps at user configured time periods to transform inbound transactions according to the user defined rules into a set of outbound transactions that may then be posted to one or more outbound services, such as the general ledger. A workflow security step may be utilized to ensure that no single user may perform all of the steps of the process in order to comply with the appropriate regulatory and/or security regimes, such as that imposed by Sarbanes Oxley (SOX). Illustratively, the workflow step causes a plurality of different users to be required to execute all of the steps of the RECAST.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

The present invention provides a system and method for revenue and expense realignment that includes a user configurable rules engine that implements a series of rule based steps to transform inbound revenue and/or expense transactions before posting to the general ledger. A revenue and expense tracking system (RECAST) executes on a computer within a network operatively interconnected to one or more transaction servers, which illustratively generate revenue and/or expense transactions.

Figure 1:
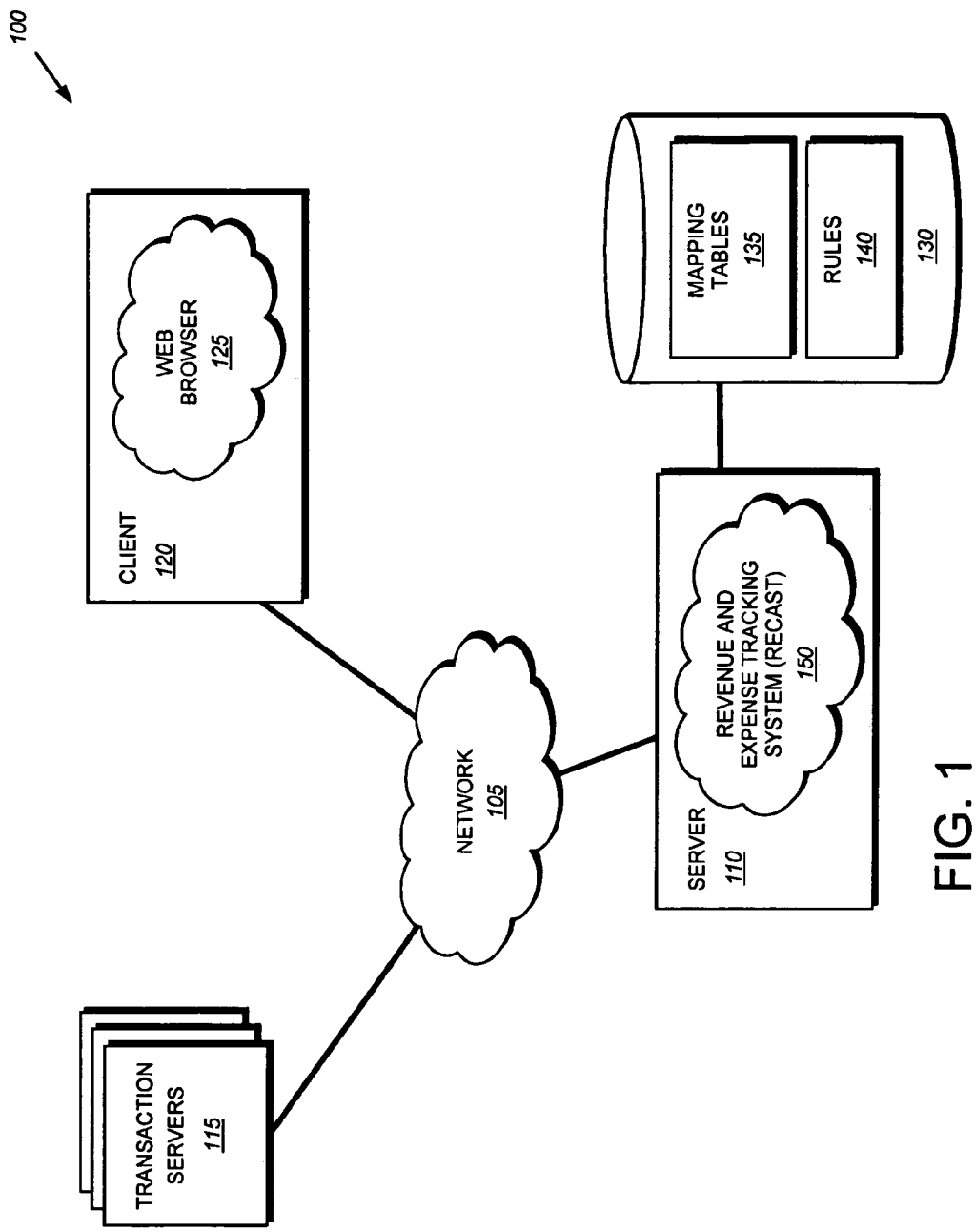
FIG. 1 is a schematic block diagram of an exemplary computer network environment in accordance with an embodiment of the present invention.

FIG. 1 is a schematic block diagram of an exemplary network environment 100 in as which the principles of the present invention may be implemented in accordance with an embodiment of the present invention. The environment 100 is centered around a network 105 that may comprise any conventional form of networking including, for example, a TCP/IP network, a virtual private network (VPN), a local area network (LAN) or a wide area network (WAN), such as the well-known Internet. Operatively interconnected with the network 105 is a server 110 executing the novel revenue and expense realignment application (RECAST) 150 of the present invention. The server may comprise a general purpose computer executing an operating system, such as the well-known Microsoft Windows operating system, or may comprise specialize server hardware for dedicated use in executing the RECAST 150.

Connected to the server 110 is a set of storage devices 130 that store one or more mapping tables 135 and/or a set of rules 140. Illustratively, the mapping tables 135 and rules 140 may be stored within a database. The database may comprise any conventional form of database including, for example, a conventional SQL database. The storage devices 130 are illustratively disk drives, however, in alternate embodiments, the storage devices 130 may comprise any form of storage, including, e.g., Flash RAM, battery backed non-volatile random access memory (NVRAM), etc. As such, the description of storage devices 130 as disks should be taken as exemplary only.

The mapping tables 135, described further below, are utilized for mapping various inbound transactions into a uniform transaction format (UTF) for use by the RECAST 150. The set of rules 140, described further below, define operations to be performed to implement a set of user customizable logic for processing transactions in accordance with an embodiment of the present invention.

Also operatively connected to the network 105 are one or more transaction servers 115. The transaction servers 115 may comprise revenue sources that generate revenue transactions signifying the revenue of the business entity and/or expense sources that generate expense transactions representing expenses of the business entity. The transactions servers 115 may output transactions utilizing any of a plurality of different transaction formats. Illustratively, these varying transaction formats are converted to a universal transaction format (UTF) by the RECAST 150, as described further below. In alternate embodiments of the present invention, transaction servers 115 output transactions in the UTF. In such alternate embodiments, the RECAST 150 may directly process the received UTF transactions without needing to convert the received transactions.

Additionally, the transactions servers 115 may output transactions at various levels of granularity, e.g., associated revenue with a particular product, a particular salesperson, a sales office, a division, etc. By utilizing the RECAST 150 of the present invention, the various transactions output by the servers 115 may be transformed according to the set of rules 140 into varying levels of granularity desired by users of the RECAST 150. Thus, by use of the RECAST 150, multiple sets of books at various levels of granularity may be kept by the application without requiring redundant general ledger transaction servers, etc. Thus, for example, by utilizing the same transactions servers 115, the RECAST 150 may be able to perform operations on the level of a salesperson, a sales office, a division, or any other hierarchical organizational level of the business entity. Thus, the RECAST 150 provides the capability to generate any number of independent sets of books.

Furthermore, a client 120 that illustratively executes a Web browser 125 is connected to network 105. Illustratively, a user of the RECAST 150 utilizes the Web browser 125 to connect to the RECAST 150 for management purposes. However, it should be noted that in alternate embodiments, other forms of communication other than Web browsers may be utilized in connecting with the RECAST, including, for example, a command interface (CLI) over a network connection.

It should be noted that the environment 100 is exemplary only and that different system configurations may be utilized in accordance with various embodiments of the present invention.

B. Application Data Flow The RECAST illustratively comprises a plurality of modules including inbound and outbound interface modules that convert incoming data to/from a universal transaction format (UTF) that is utilized by the RECAST. The RECAST also includes a user interface (UI) module and associated statement builder module that permit a user to generate IF/THEN/ELSE logical statements as rules for processing received transactions. A user of the RECAST may access the UI via a web browser to configure appropriate data mappings, data sources, define one or more rules and one or more steps to be executed by the RECAST rules engine.

Figure 2:
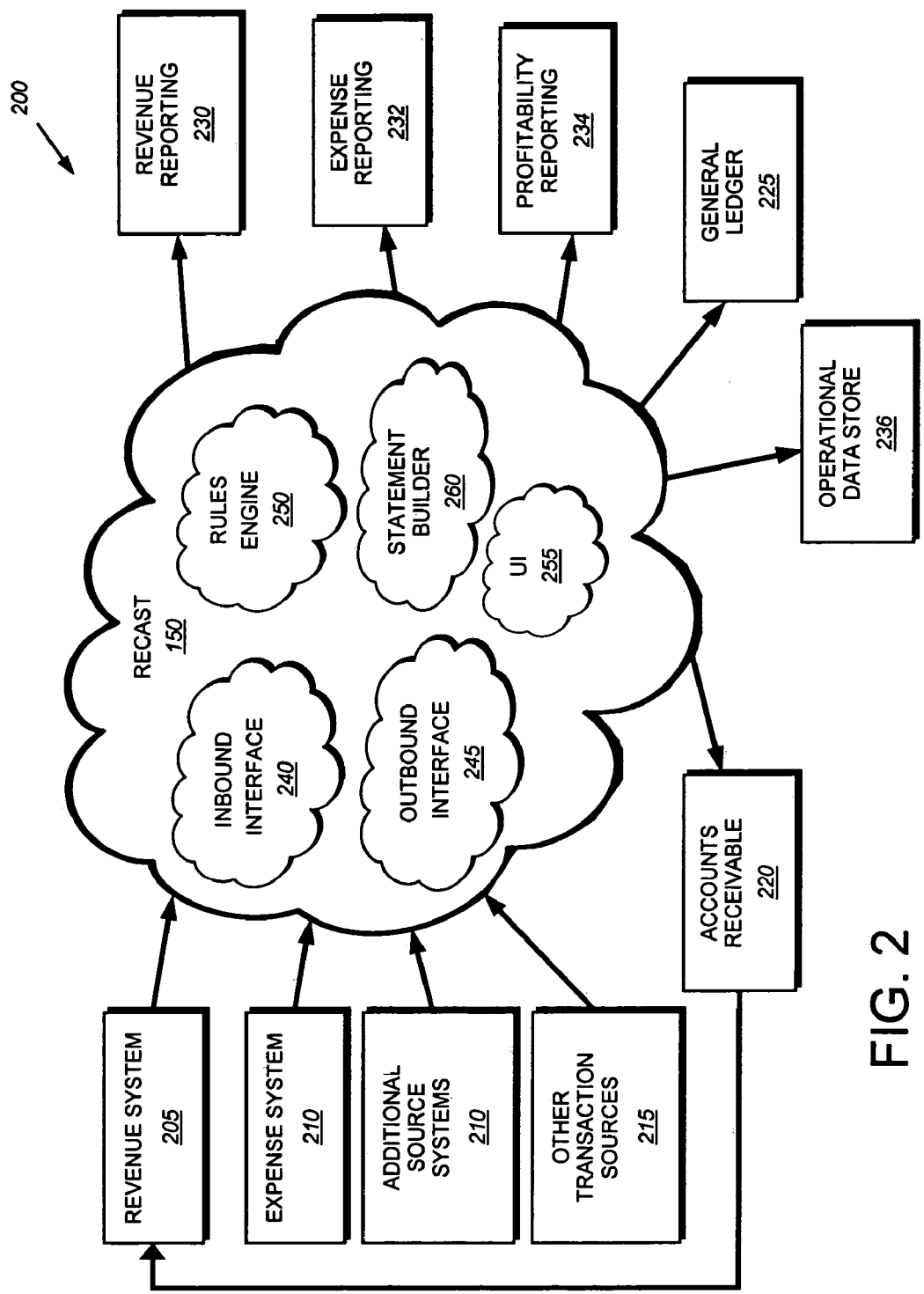
FIG. 2 is a schematic block diagram of an exemplary revenue and expense realignment application (RECAST) and data flow in accordance with an embodiment of the present invention.

FIG. 2 is a schematic block diagram of an exemplary data flow diagram 200 in accordance with an embodiment of the present invention. The diagram 200 illustrates that the RECAST 150 is illustratively comprised of a plurality of different modules including, e.g., an inbound interface module 240, and outbound interface module 245, a rules engine module 250, a user interface (UI) module 255 and a statement builder module 260. It should be noted that in alternate embodiments, additional and/or differing modules may be utilized without departing from the spirit or scope of the present invention. Additionally, it should be noted that in alternate embodiments the various systems, described further below, including revenue systems 205, expense systems 207, additional source system 210, other transaction sources 215, the general ledger 225, Accounts Receivable module 220, revenue reporting module 230, expense reporting module 232, profitability 30 reporting module 234 and/or an operation data store 236 may be combined into one or more individual systems. As such, the description of each of the functions being performed by different systems should not be taken to limit the scope of the present invention.

The inbound interface module 240 converts incoming transactions from a plurality of formats into a universal transaction format (UTF) utilized by the rules engine 250 while processing transactions. Similarly, the outbound interface module 245 converts transactions in the UTF to appropriate formats for posting to the general ledger and/or other systems. Such conversion occurs using a set of user defined mapping tables 135 which identify the relationship between fields in a transaction protocol and the UTF. Additionally, certain fields in the UTF may be completed by accessing different data sources. For example, conversation rates between currencies may be obtained separately from the inbound transaction to complete one or more of the UTF fields. That is, the RECAST may augment received data by using lookup tables and/or user defined rules. Such data augmentation may be performed prior to the invocation of the rules.

Illustratively, the RECAST 150 has as inputs a plurality of revenue systems 205, expense systems 207, additional data source systems 210 and/or other transaction sources 215. The revenue systems 205 and aexpense systems 207 transmit revenue and/or expense transactions to the RECAST 150. Additional source systems 210 are utilized to transfer reference data to the RECAST 150. For example, the additional source systems 210 may store conversion rates, such as between the United States Dollar and the British Pound for use in performing various calculations. The other transaction sources 215 may transmit other transactions, e.g., refunds or interest income, to the RECAST 150. The RECAST 150 illustratively sends to the general ledger 225 transactions that have been processed by the rules engine 250 in accordance with the user configured rules 140. Additionally, certain accounts receivable (AR) postings may be forwarded to an AR module 220, which may then forward them to appropriate revenue systems 205. Additionally, the RECAST 150 may be utilized to generate various reports by outputting data to various reporting modules, including, e.g., a revenue reporting module 230, an expense reporting module 232, and/or a profitability reporting module 234. Additionally, in certain alternate embodiments, a user may desire the RECAST to output transactions to an operational data store 236, which serves as a data repository of transactions for use in generating additional reports.

It should be noted that the data flow diagram 200 is exemplary only and that the RECAST 150 may be utilized in a variety of alternate systems with differing inputs/outputs.

C. Configuration

A rules engine of the RECAST executes the series of the rule based steps at user configured time periods to transform inbound transactions according to the user defined rules into a set of outbound transactions that may then be posted to one or more outbound services, such as the general ledger. A workflow security step may be utilized to ensure that no single user may perform all of the steps of the process in order to comply with the appropriate regulatory and/or security regimes, such as that imposed by Sarbanes Oxley (SOX). Illustratively, the workflow step causes a plurality of different users to be required to execute all of the steps of the RECAST.

Figure 3:
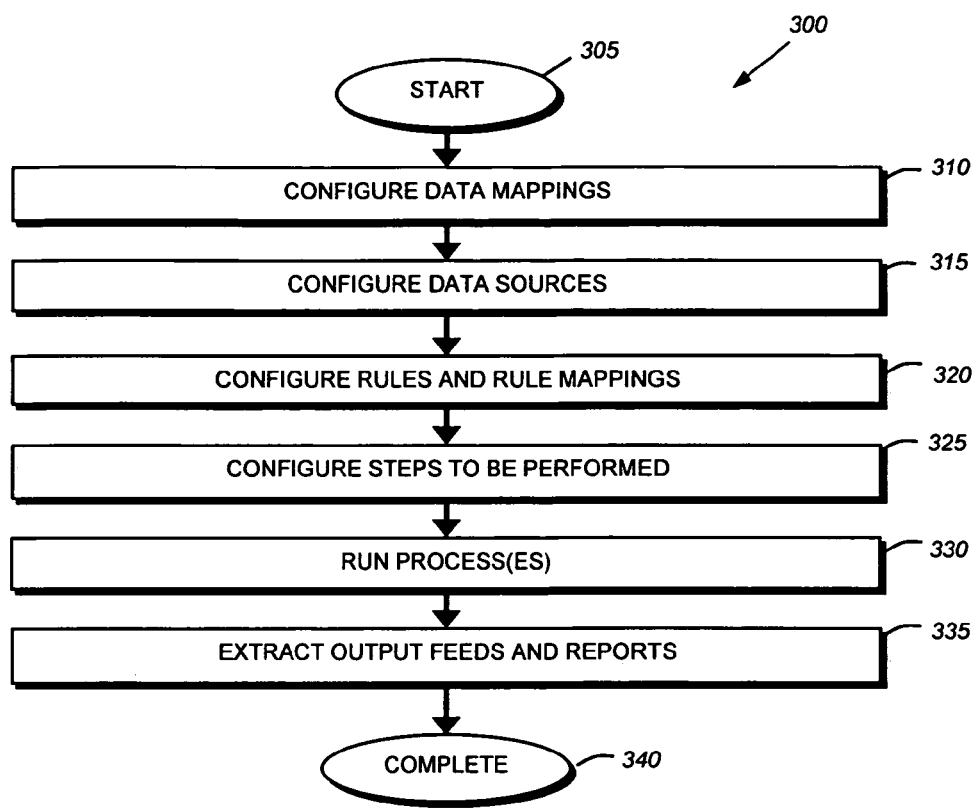
FIG. 3 is a flowchart detailing the steps of a procedure for configuring and operating the RECAST in accordance with an embodiment of the present invention.
Figure 4:
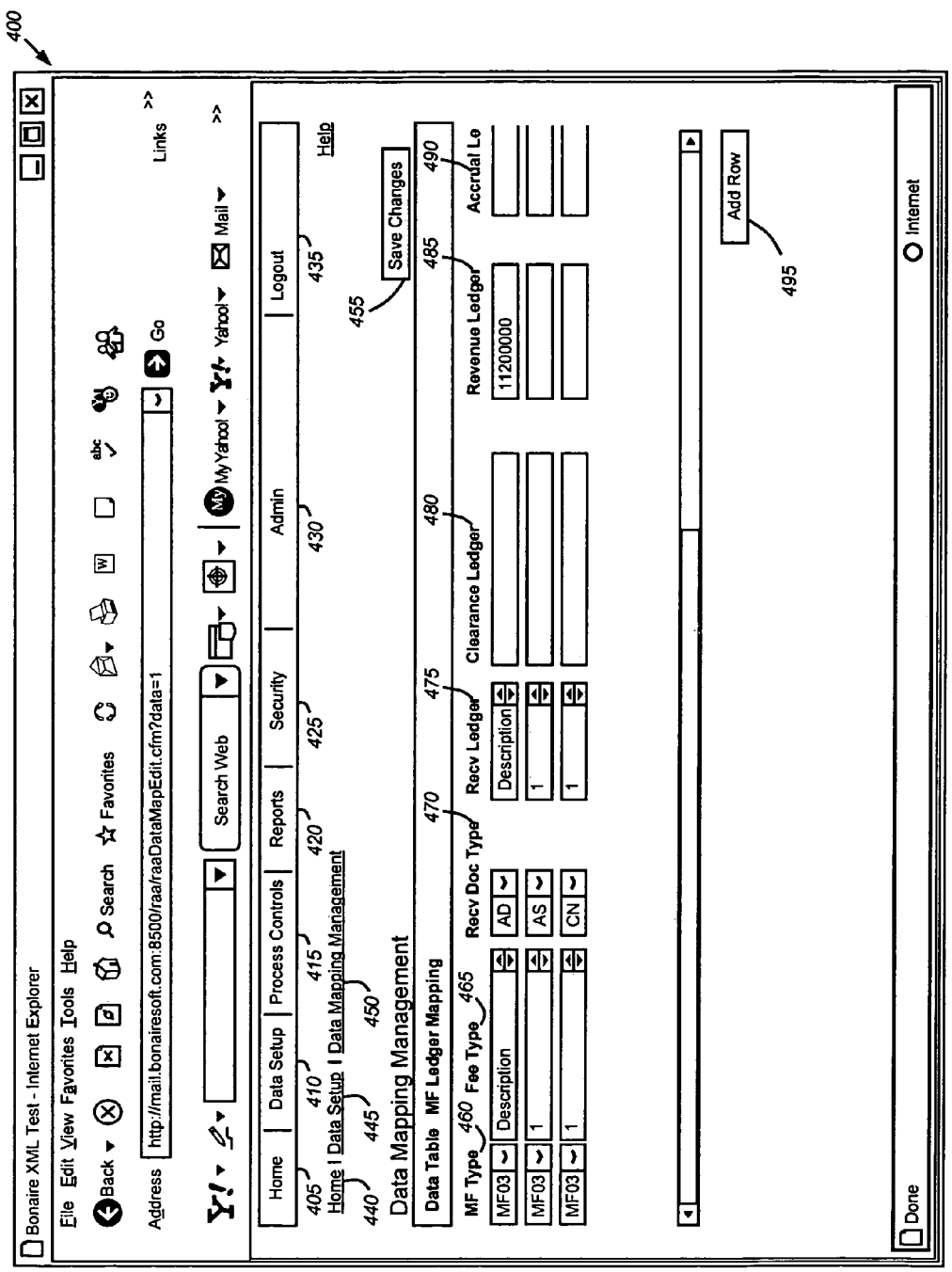
FIG. 4 is a screenshot showing a graphical user interface (GUI) window illustrating data mapping in accordance with an embodiment of the present invention.

FIG. 3 is a flowchart detailing the steps of a procedure 300 for configuring and executing the RECAST 150 in accordance with an embodiment of the present invention. The procedure 300 begins in step 305 and continues to step 310 where a user first configures the data mappings for use with the RECAST 150. The step of configuring the data mappings permits the user to create various mappings from the inbound/outbound data formats to a universal transaction format/universal data format (UTF/UDF). Typically, this is performed via GUI provided by the UI module 255. An exemplary screenshot of the GUI is shown in FIG. 4, described further below. Illustratively, the RECAST 150 operates utilizing a UTF that includes fields having most commonly associated with revenue and expense transactions. For particular specialized applications, additional fields may be defined that are appended to the UTF. These additional fields are termed UDF. The combined UTF/UDF represents the entire received transaction. Illustratively, UDFs may be created for each specialized type of accounting required, e.g., medical, manufacturing, financial, etc. For ease of understanding, the combined UTF/UDF is referred to herein as UTF. In alternate embodiments, the UTF may be defined so as to include all of the UDF information. As such, the description of utilizing a UTF/UDF is to be taken as exemplary only.

More generally, the step of configuring data mappings (step 310) enables the user to configure the RECAST 150 to accept inbound data for transactions from any appropriate protocol format. By enabling the user to configure data mappings, the RECAST 150 is customizable for use with any inbound data transaction and is thereby not limited to currently known transaction formats and/or source systems. Additionally, a user may configure the RECAST 150 to perform data augmentation on incoming data. For example, certain fields may be augmented with data from lookup tables and/or user defined rules before the transactions are passed to the rules engine for processing.

However, in alternate embodiments, if the RECAST 150 is part of a closely coupled system, where each of the components is provided by a single vendor, there may be no need for data mappings if the entire system, including transactions servers, the application and the general ledger all utilize a common data format. However, in general, accounting systems utilize software from a plurality of differing vendors which may utilize different formats. Thus, the capability to configure data mappings in step 310 enables the RECAST 150 to be utilized with a wide variety of accounting systems.

Figure 5:
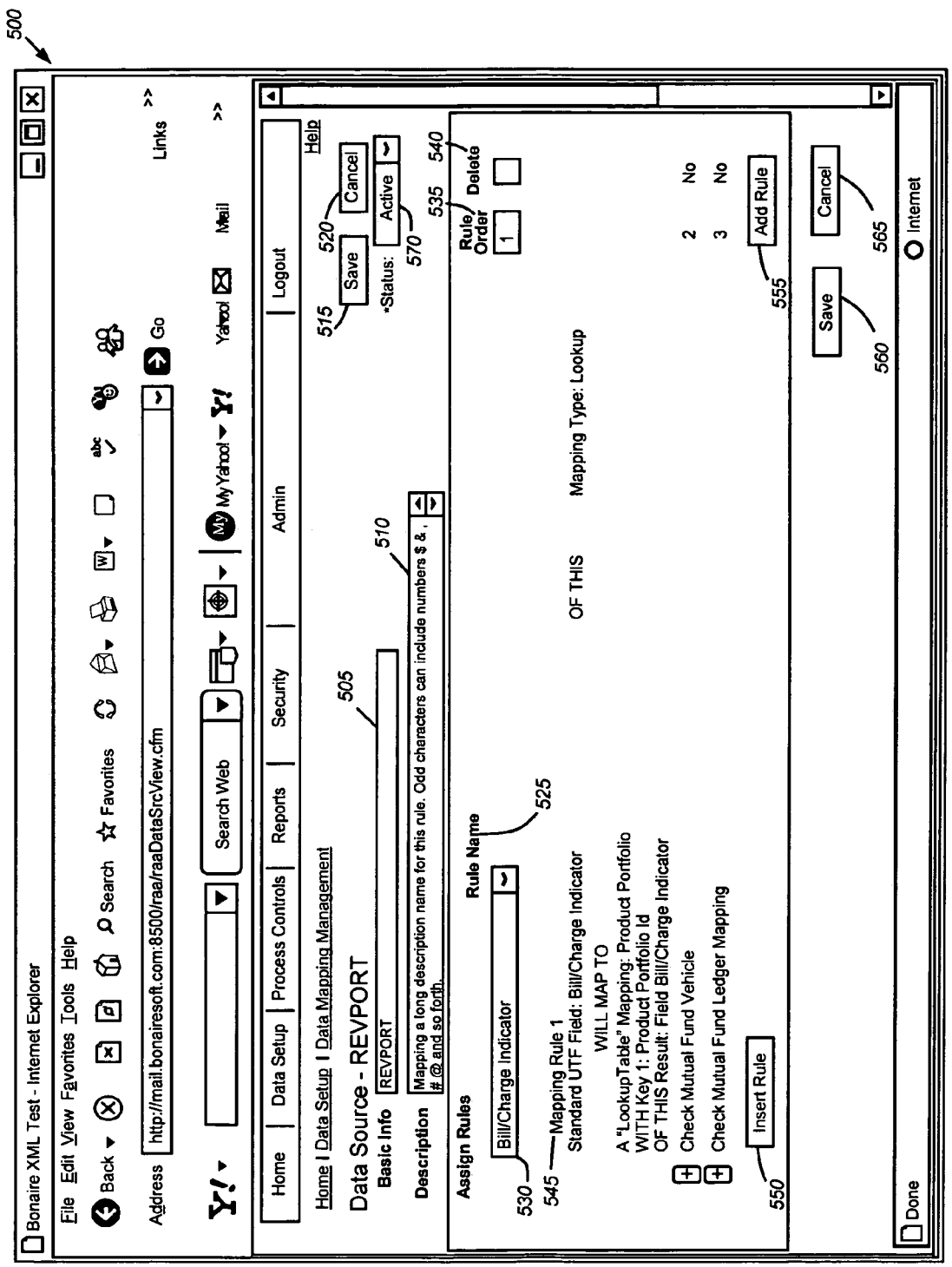
FIG. 5 is a screenshot showing a GUI window illustrating data source management in accordance with an embodiment of the present invention.

In step 315, the user configures the appropriate data sources. As noted, this may be performed via a GUI provided by the UI module 255. An exemplary screenshot of this GUI is shown in FIG. 5, described further below. During this step, the user identifies to the RECAST 150 which transactions servers will be utilized for inbound transactions. Similarly, the user may identify additional source systems and/or additional transaction systems to be utilized by the RECAST 150. By identifying the source of transactions, the user may then associate appropriate data mappings with a data source. For example, if the user configures the RECAST 150 to utilize inbound transactions from a particular transaction server utilizing a given protocol, the user may associate the data mappings associated with that protocol with the particular transaction server to thereby enable the RECAST 150 to properly map inbound transactions from the protocol to the UTF.

Figure 6:
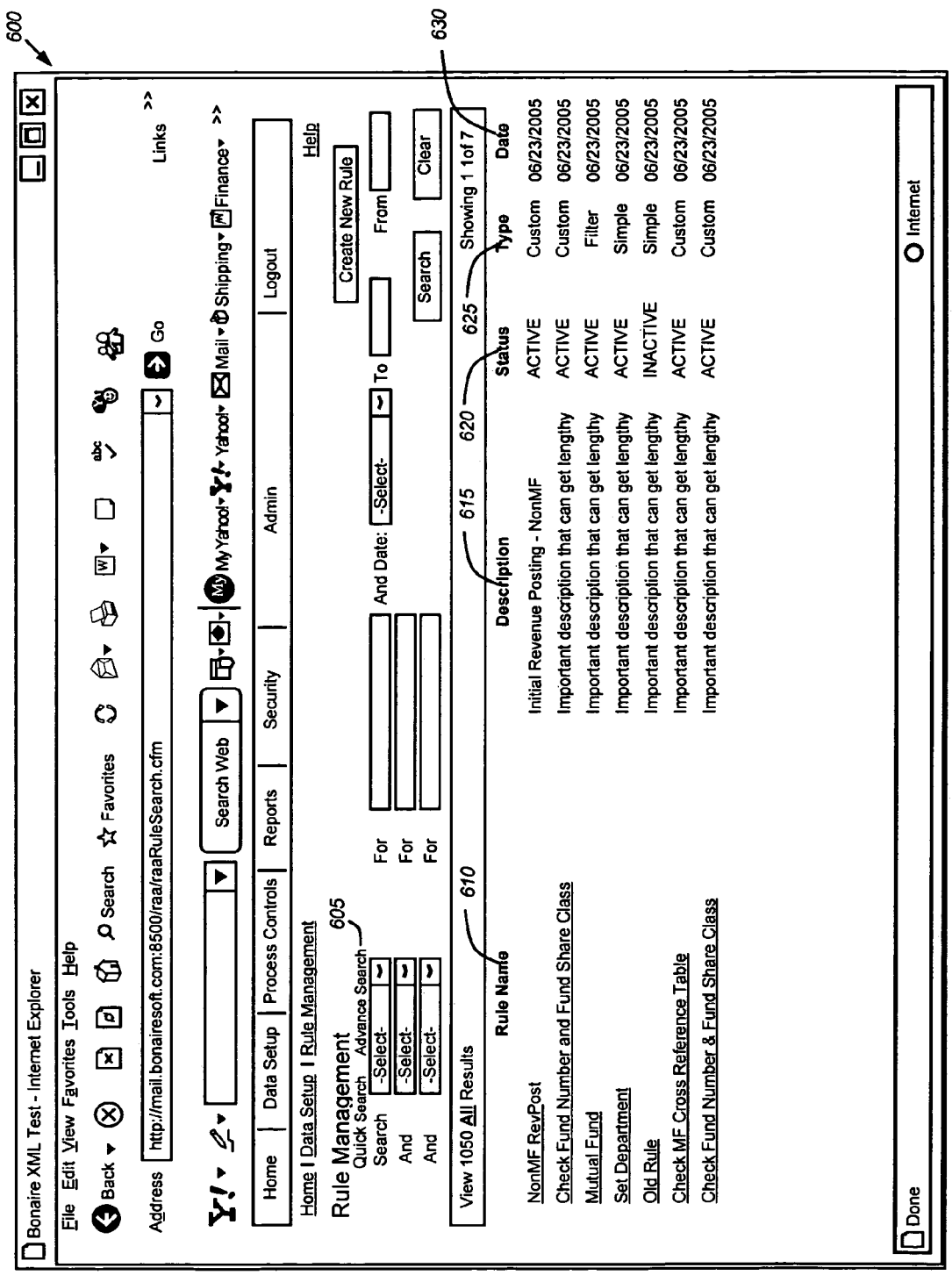
FIG. 6 is a screenshot showing a GUI window illustrating rule mapping in accordance with an embodiment of the present invention.
Figure 7:
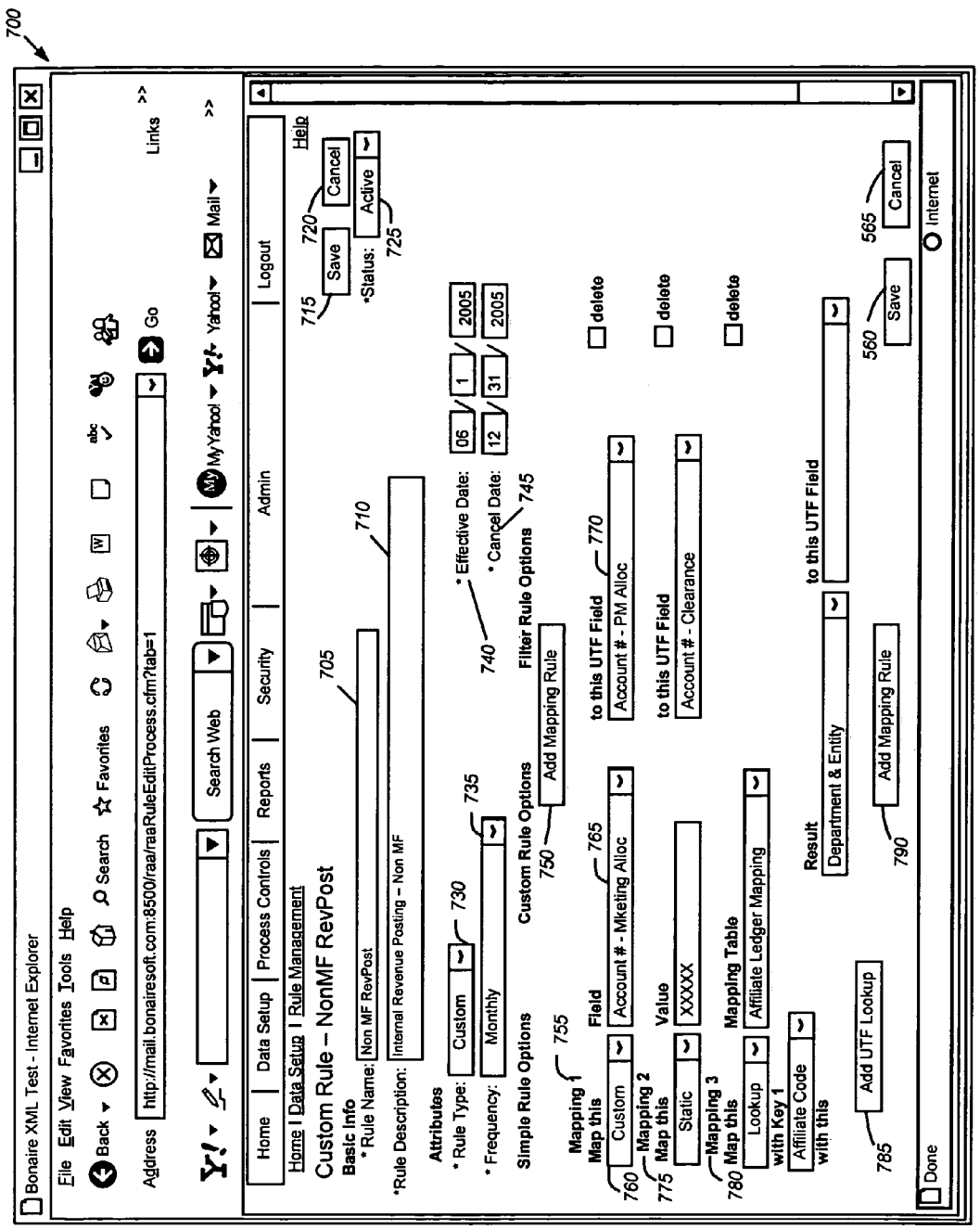
FIG. 7 is a screenshot showing a GUI window for editing a simple rule in accordance with an embodiment of the present invention.
Figure 8:
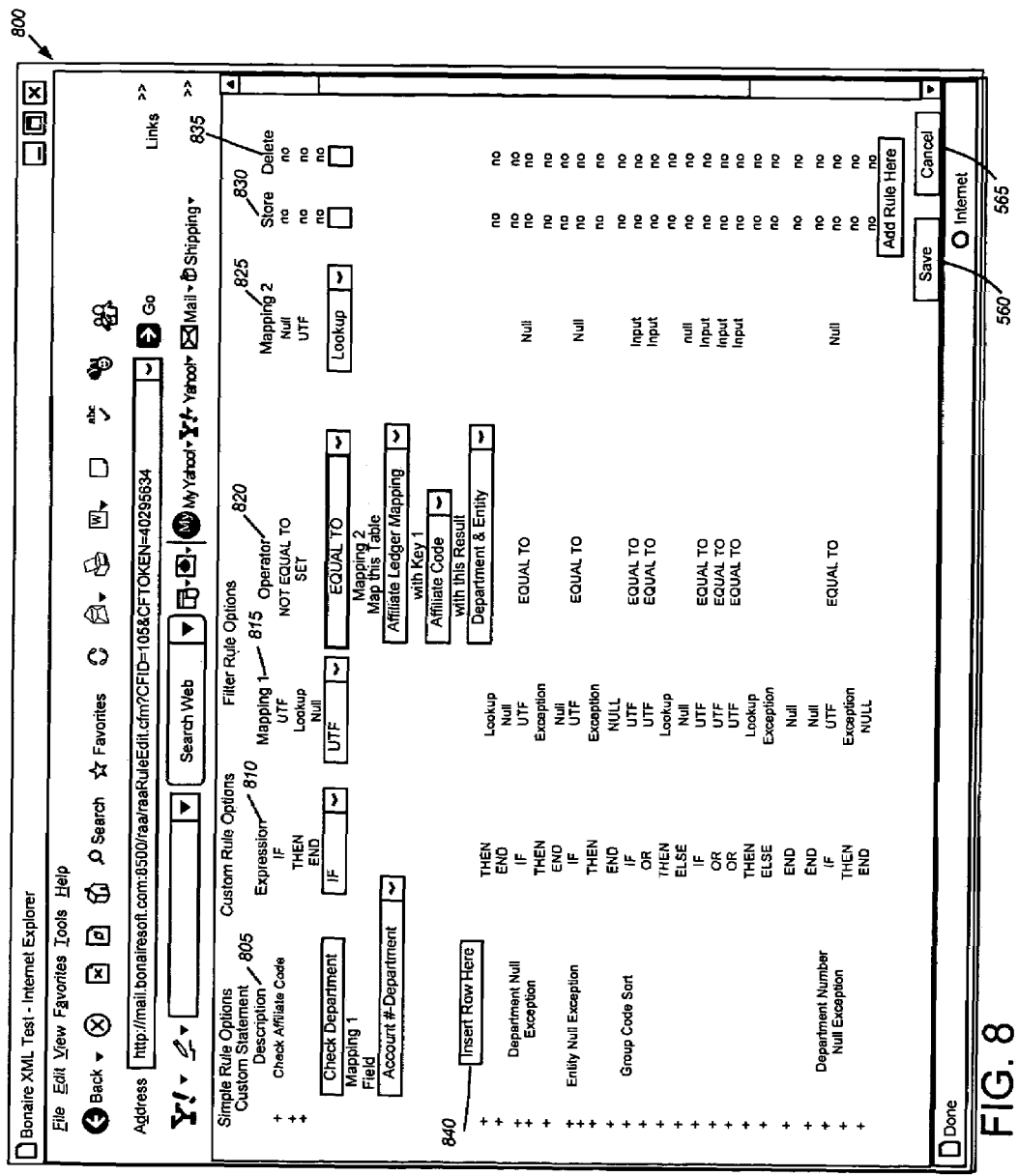
FIG. 8 is a screenshot showing a GUI window for editing a custom rule in accordance with an embodiment of the present invention.

The user then, in step 320, configures the appropriate rules and mappings. By configuring the rules and rule mappings, the user is able to utilize one or more simple rules that are predefined by the application and/or one or more customizable complex rules that may be defined by the user using IF/THEN/ELSE logic to which the rules may be as simple as if a particular transaction is posted to a certain account number in the inbound services, ensuring that it is posted to a different account in the outbound one to as complex as many multi-step conditional logic operations. One noted advantage of the present invention is that the RECAST 150 enables a user to dynamically define rules using UI 255 without requiring reprogramming of software, that is, an end user can program the desired rules without the need of an extensive IT department. Such ease of use adds to the functionality of the RECAST 150. Exemplary screenshots of a GUI for performing this step are shown in FIGS. 6-8, described further below.

Figure 9:
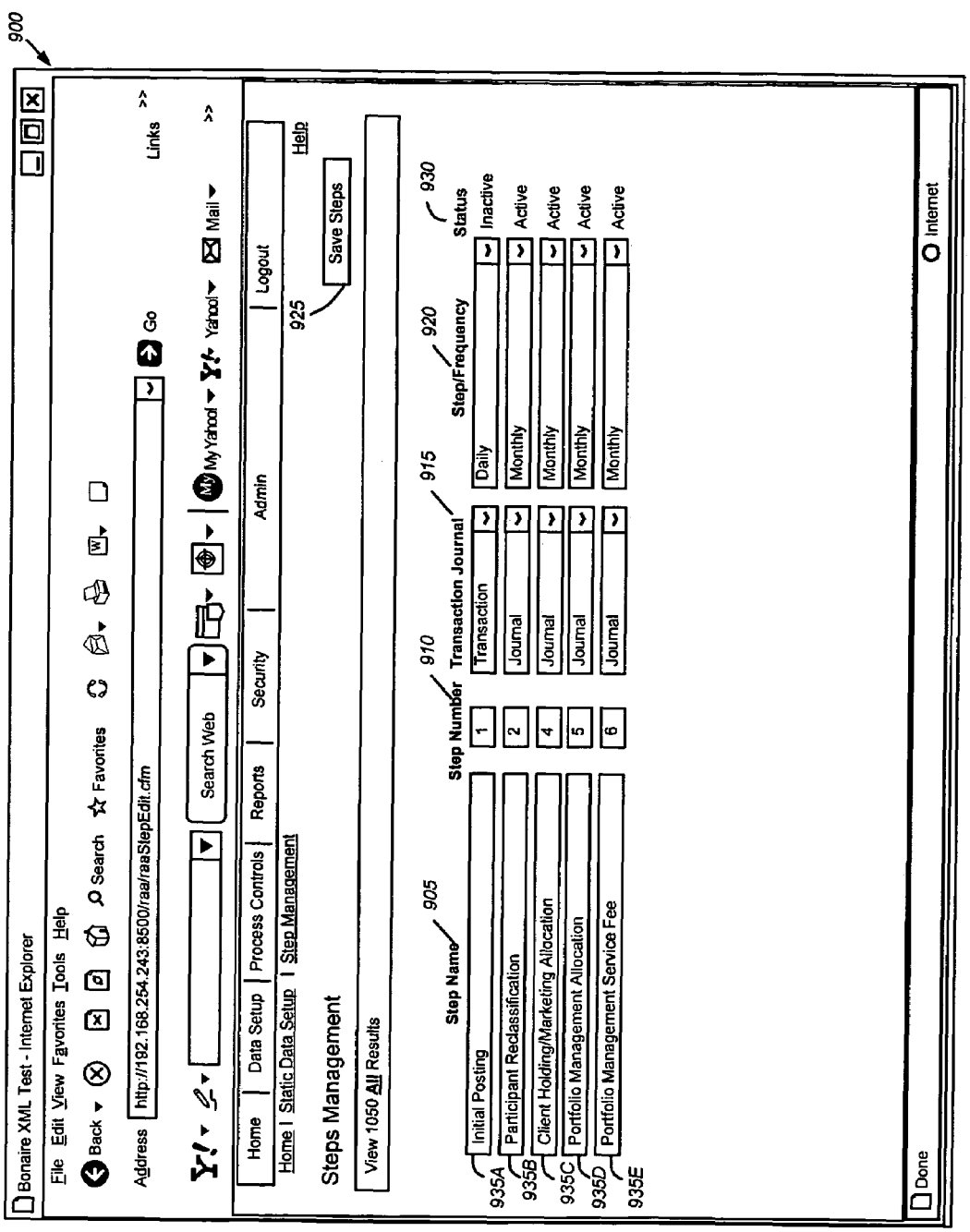
FIG. 9 is a screenshot showing a GUI window illustrating steps management in accordance with an embodiment of the present invention.

The user configures the steps to be performed, including associating one or more rules with each step in step 325. An exemplary screenshot of a GUI for performing this step is shown in FIG. 9, described further below. After the various rules have been configured, the rules may be associated with one or more steps performed during the process. Each step may then be executed at a predetermined time. Thus, for example, a first step may be configured to execute on a daily basis, while steps a second step is configured to execute on a weekly basis and a third step is configured to execute on a monthly basis. Each of the steps is associated with one or more rules that have been previously configured.

Figure 10:
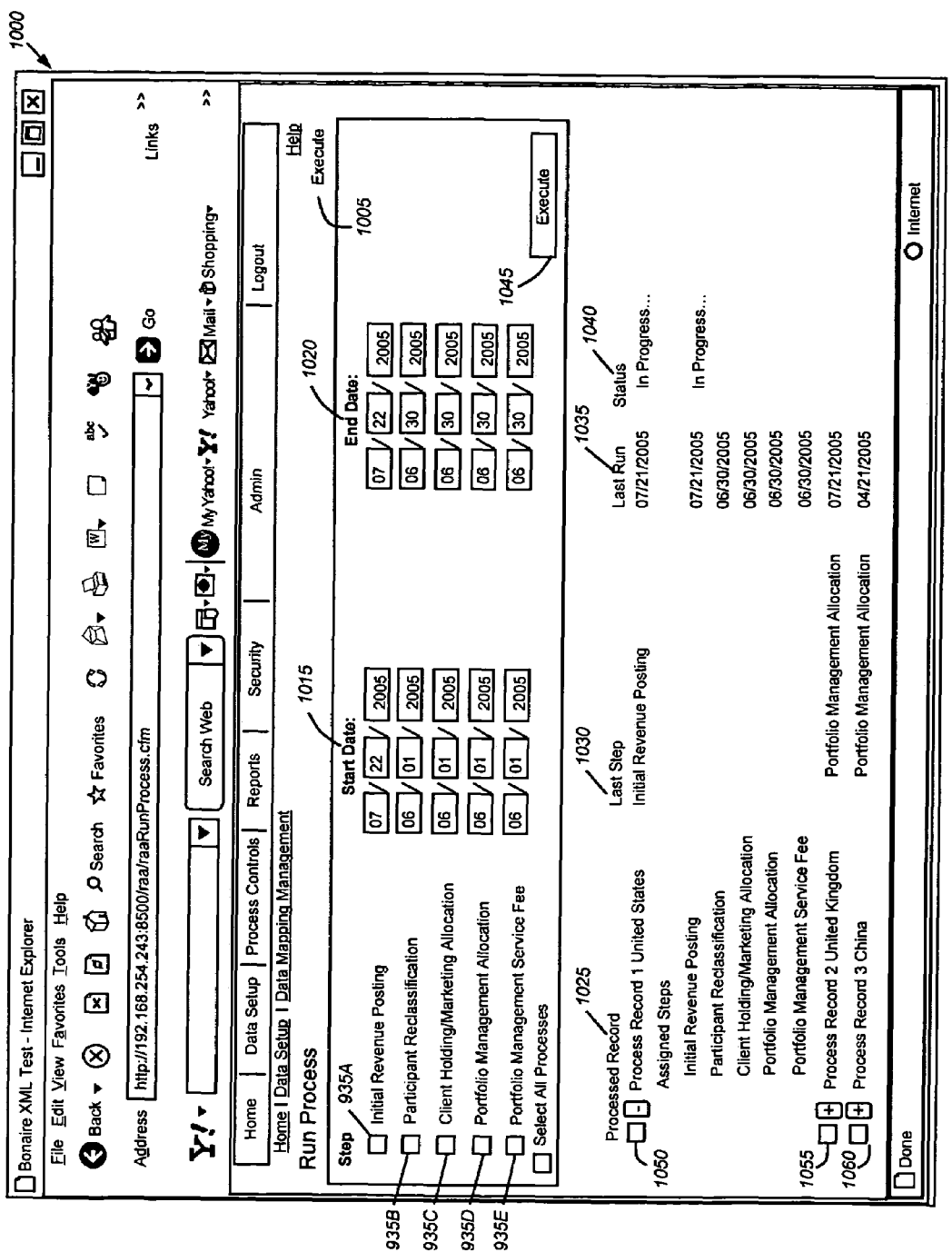
FIG. 10 is a screenshot showing a GUI window illustrating executing process in accordance with an embodiment of the present invention.
Figure 11:
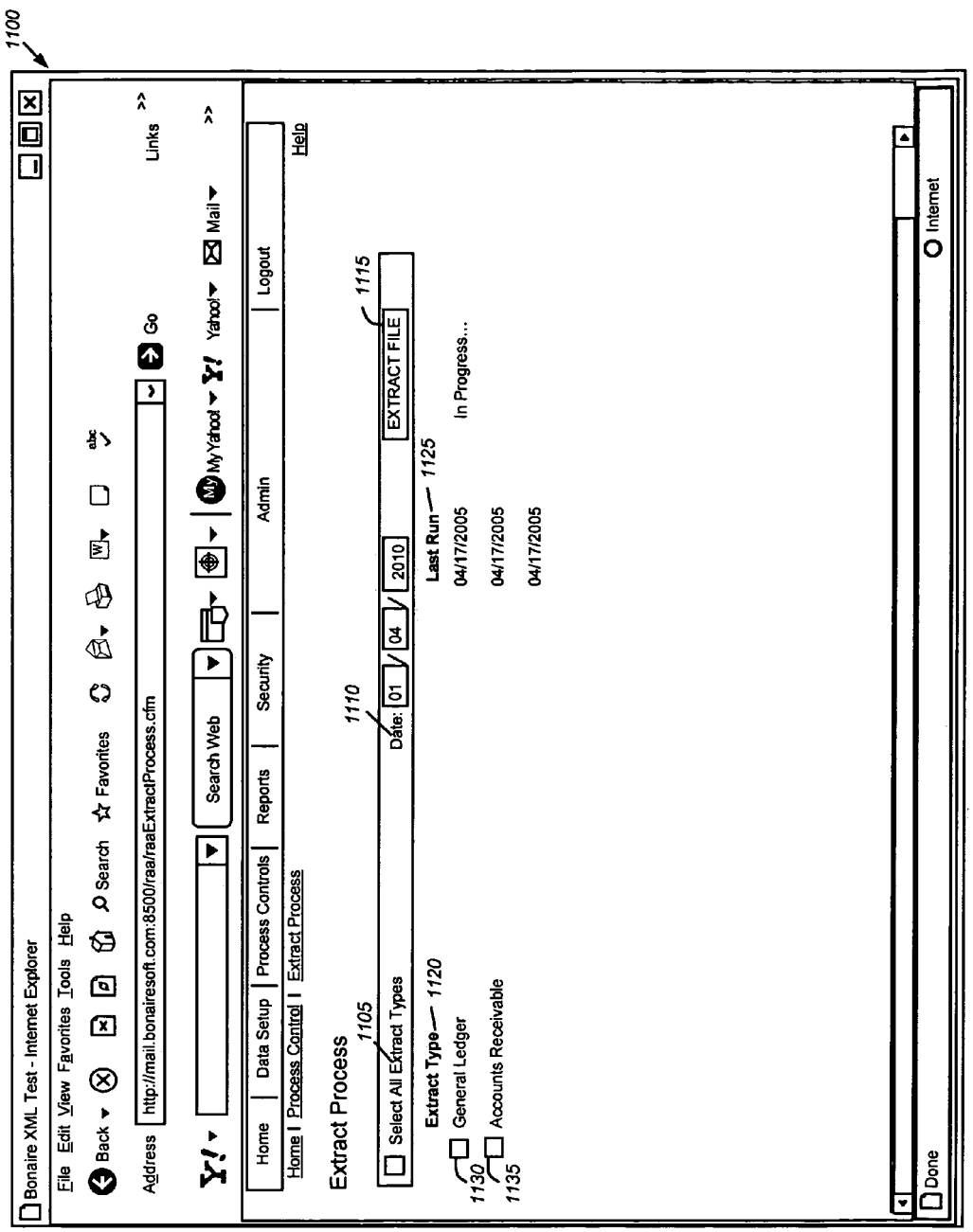
FIG. 11 is a screenshot showing a GUI window illustrating extracting reports in accordance with an embodiment of the present invention.

The appropriate processes are then executed in step 300. The execution of the. processes is described further below in reference to procedure 1200 described in reference to FIG. 12, while an exemplary screenshot of a GUI for performing this step is shown in FIG. 10, described further below. The output feeds and/or reports are extracted in step 335, of which an exemplary GUI is shown in FIG. 11, described further below, before the procedure 300 completes in step 340. The output feeds may be forwarded to the general ledger or any other system that desires copies of the processed transactions. Various reports may be run to track the progress of the completion of the various rules and/or steps and to also provide the ability to verify proper processing of the inbound transactions.

The RECAST 150 of the present invention enables a user to customize its operation to enable the RECAST 150 to be utilized in any desired accounting environment. By enabling the user to customize the data sources, data mappings and rules and steps to perform, the RECAST 150 permits the user to perform accounting and expense realignment operations with nearly unlimited flexibility that is not possible using conventional accounting systems. Additionally, the RECAST 150 permits the user to generate reports sets of books at multiple levels of granularity and including, for example, at the business entity level, division level, office level, product level, salesperson level. Furthermore, by generating appropriate rules, the allocation of revenue generated by particular product may be apportioned among various sub entities of the business entity, even if the revenue source associated with the product only exports data at the product level.

D. Graphical User Interface

As noted above, in the illustrative embodiment, the RECAST 150 includes a UI module 255 that presents a GUI to users via a Web browser 125. Alternate UI techniques may be utilized with the present invention in alternate embodiments. For example, the UI module 255 may present a command line interface (CLI) that permits users to generate scripts for performing various functions. Alternately, the UI module 255 may provide a GUI on a display connected locally to the server 110 executing the RECAST 150. Such an embodiment may be desired to provide additional degrees of security by preventing and/or limiting clients from connecting to the server 110. As such, the description of the GUI screenshots described herein should be taken as exemplary only and not to limit the scope o the present invention.

FIG. 4 is a screenshot of an exemplary graphical user interface window 400 illustrating data mapping in accordance with an embodiment of the present invention. The window 400 may be illustratively generated by the user interface for display in a Web browser in accordance with an embodiment of the present. The window 400 includes a row of menu options including, e.g., a home menu 405, a data set up menu 410, a process controls menu 415, a reports menu 420, a security menu 425, an administration menu 430 and a logout menu 435. Additionally, a submenu within the data set up menu 410 includes a home link 440, a data set up a link 445 and a data mapping management link 450. The data mapping window 400 is utilized by the user to enter mapping information for establishing transformations from external transaction formats to the UTF. As such, the window 400 may be utilized by the user to enter one or more rows of data mappings. Each mapping illustratively includes a mapping type field 460, a fee type 465, a received document type 470, a received ledger field 475, a clearance ledger field 480, a revenue ledger field and an accrual ledger field 490. During the course of step 310 of procedure 300, the user may modify these fields as is necessary for the environment in which the RECAST 150 is to be utilized. To add an additional mapping, the user may select an Add row button 495. Once changes have been completed, the user may Save Changes by selecting Save Changes button 455.

FIG. 5 is a screenshot of an exemplary graphical user interface window 500 for data source management in accordance with an embodiment of the present invention. The window 500 is illustratively generated by the user interface module to permit the user to identify mapping rules associated with a particular data source. The window 500 includes a name field 505, a description field 510 and a status menu 540. The name field 505 permits the user to enter a name for the data source. The description field 510 permits the user to enter a description of the data source. The status menu 540 permits the user to select whether this data source is active or inactive. The remaining portion of the window permits seeing the user to insert a rule by, e.g., selecting the Insert Rule button 550. Similarly, toad a rule to the rule set, the user may select the Add Rule button 555. Once changes have been completed, a user may select Save button 515. Should the user desire to not save changes, the user may select the Cancel button 520.

FIG. 6 is a screenshot of an exemplary graphical user interface window 600 for rule mapping and maintenance in accordance with an embodiment of the present invention. A user may utilize the advanced search fields 605 to identify one or more rules that have been entered into the rule set. Rules are illustratively displayed in a multi-column format including, e.g., a rule name column 610, a description: 615, a status column 620, a type column 625 and a date column 630. The rule name column 610 identifies the rule by a user identified name. The description column 615 displays a longer description (than the name) of the rule. The status column 620 identifies whether the rule is active and/or inactive. The type column 625 identifies the type of rule. Illustratively, rules may be of a SIMPLE or CUSTOM type. SIMPLE type rules may be selected from a graphical user interface such as that shown in windows700 of FIG. 7. CUSTOM type rules may be user defined using the user interface such as that shown in window 800 of FIG. 8.

FIG. 7 is a screenshot of an exemplary graphical user interface window 700 for editing a SIMPLE type rule in accordance with an embodiment of the present invention. The window 700 includes a rule name field 705 that enables the user to enter a name for the rule so that the rule may be easily identified in other portions of the user interface. The rule description field 710 enables the user to enter a longer description of the rule with a longer length than permitted by the rule name field 705. A Save button 560 permits the user to save the edited rule, while a Cancel button 565 cancels out of the window 700. A status menu 725 permits the user to identify the status of the rule, for example, ACTIVE or INACTIVE. A set of attributes menus including, e.g., a rule type menu 730, a frequency menu 735, an effective date menu 740 and a cancel date menu 745 permit the setting of various attributes associated with the rule. The rule type menu 730 permits the user to define the type of rule, for example a custom or prepackaged rule. The frequency menu 735 permits the user to identify how often the rule should be executed, e.g., daily, monthly, weekly, etc. The effective date field 740 and cancel date field 745 permit the, user to identify when the operation of the rule should begin and end.

A plurality of mappings 755, 775 and 780 enable the user to identify the operations to be performed by this rule. An Add Mapping Rule button 790 permits the user to add an additional mapping rule to this rule. Each mapping 755 includes a from field 760 that identifies a type of data to be mapped from a field 765 to a UTF field 770.

FIG. 8 is a screenshot of an exemplary graphical user interface window 800 for editing a CUSTOM type rule and accordance with an embodiment of the present invention. The window 800 permits the user to edit a CUSTOM type rule by generating a set of IF/THEN/ELSE logic statements to be processed by the rules engine. The window 800 illustratively includes a number of columns including, for example, a description column 805, an expression column 810, a first mapping column 815, an operator column 820, a second mapping column 825, a store column 830 and a delete column 835. The Description column 805 permits the user to enter a brief description of each of the steps of the rule. The expression column 810 contains an expression to be evaluated, such as a logical operation, e.g., IF/THEN/ELSE/OR/etc. The first mapping column 815 is read in conjunction with the operator column 820 and the second mapping column 825 to implement the set of logic. If the operator column 820 may illustratively include such operators as EQUAL TO/SET/etc. The first and second mapping columns 815, 825 are utilized to identify which particular fields of the UTF are to be acted upon. For example, a particular account number may be utilized, etc. Once the user has entered the logic that he desires, the user may click on the Save button 560 to save the generated rule. Similarly, the user may click on a Cancel button 565 to cancel the rule and not save the edited rule.

FIG. 9 is a screenshot of an exemplary graphical user interface windows 900 illustrating steps management in accordance with an embodiment of the present invention. The window 900 permits the user to organize and administer the steps to be processed in accordance with an embodiment of the present invention. The window 900 includes a number of columns including a step name column 905, a step number column 910, a transaction journal column 915, a frequency column 920 and a status column 930. Illustratively, there is an entry 935A-E for each of the user defined steps to be performed. The step name column 905 identifies the name of the step to be performed. This may be user defined to provide a description of the actions associated with the step. The step number column 910 permits the user to identify the numerical order in which steps are to be performed. The transaction journal column 915 identifies whether the step is a transaction based step or whether it generates journal entries. The frequency column 920 permits a user to identify to set the frequency at which the steps are to be performed. The status column 930 identifies the current status, e.g., ACTIVE/INACTIVE, for the particular step. By using window 900, a user may reorder the order of execution of the steps and set the frequency at which the steps are to be performed.

FIG. 10 is a screenshot of an exemplary graphical user interface window 1000 illustrating executing the processes in accordance with an embodiment of the present invention. The window 1000 permits the user to execute the various steps previously defined in FIG. 900. The window 1000 permits the user to identify a particular step using a step field 1010, a start date 1015 and end date 1020. Once user has selected the appropriate steps to execute, the Execute button 1005 is selected which causes the RECAST 150 to execute the one or more rules associated with the selected steps. Additionally, window 1000 identifies the current progress of various steps at various levels of granularity. For example, processed record column 1025 identifies particular processes (or collection of steps to be performed) along with the associated steps. A last step column 1030 identifies the last step of each process 1055, 1055 and 1060 that has been completed. The last run column 1035 identifies the date when a particular step was last executed. The statues column 1040 identifies if any steps are currently in progress.

FIG. 11 is a screenshot of an exemplary graphical user interface window 1100 for extracting reports in accordance with an embodiment of the present invention. The window 1100 includes options for selecting a type of extract 1120 and identifying when the last data extraction occurred 1125. The user may select all extract types 1105 associated with a certain date 1110 and then extract the data by selecting button 1115. Alternately, the user may identify particular extract type 1120, for example the General Ledger 1130 or Accounts Receivable 1135.

E. Rules Engine Processing

Figure 12:
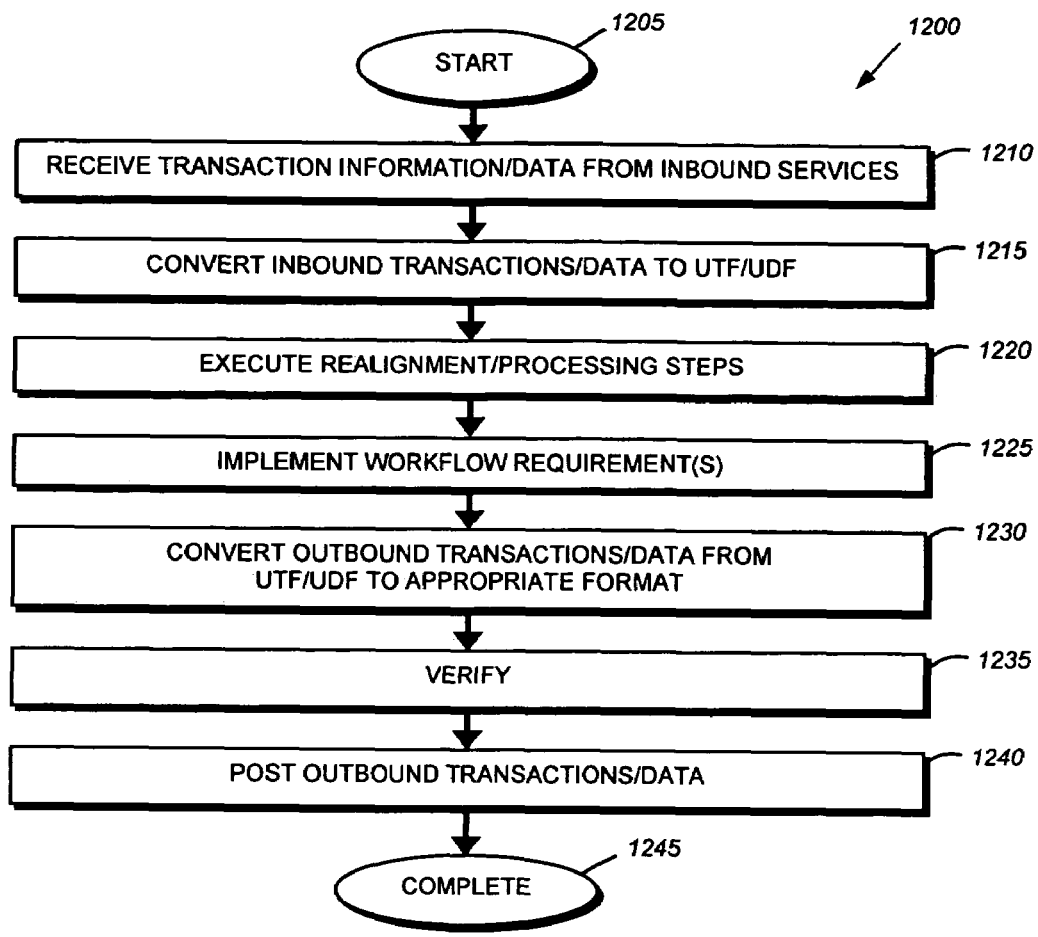
FIG. 12 is a flowchart detailing the steps of a procedure executed by a rules engine in processing steps in accordance with an embodiment of the present invention.

FIG. 12 is a flowchart detailing the steps of a procedure 1200 for performing the steps of the RECAST 150 in accordance with the embodiment of the present invention. The procedure 1200 begins in step 1205 and continues to step 1210 where the RECAST 150 receives the transaction information and/or data from one or more inbound services. Such inbound services may comprise various transaction servers including, for example, revenue sources and/or expense sources. The inbound transactions/data are then converted, in step 1215, to the UTF. Illustratively, this conversion occurs when it is performed by the inbound module services 240; however, in alternate embodiments, the various transaction servers may output transactions/data to the RECAST 150 in UTF. As noted above, the RECAST 150 may perform data augmentation to supplement received data by utilizing lookup tables to complete fields within the UTF. Once the transactions have been received, the rules engine then executes the realignment/processing steps in step 1220. This may comprise executing one or more of the user defined steps and the associated rules therewith. Illustratively, the RECAST 150 ensures that the system is balanced at the completion of each step before beginning processing of the next step. Should an erroneous transaction be identified, all transactions that were generated from the erroneous source transaction may be "rolled back" and removed from the output data path of the RECAST 150. This may be performed by associating each child transaction with its parent transaction, even across a plurality of transformation levels.

The rules engine may also, in alternate embodiment, implement workflow requirements in step 1225. The workflow requirements may be necessary to meet certain statutory and/or regulatory requirements such as that required by Sarbanes Oxley (SOX). For example, in a system having four steps, the workflow requirements may only permit a particular user to execute two of the four steps, thereby requiring two different users with appropriate authorizations to implement the entire four step process. More generally, the workflow requirements may be defined as assigning one or more steps of permissions to more than one users so that certain regulatory and/or security safeguards may be implemented.

In step 1230, the outbound transactions and data are then converted from the UTF to the appropriate format utilized by the destination system, such as the general ledger. In alternate embodiments if the general ledger (or other outbound destination services) utilizes UTF, this conversion step is not necessary. The RECAST 150 illustratively provides for a verification mechanism in step 1235. This verification is typically performed by a user of the RECAST to ensure that the outbound transactions are coherent. Once the verification has been completed in step 1235, the RECAST then posts the outbound transactions/data in step 1240. The application may post these to, for example, the general ledger and/or other accounting and/or in lieu of applications. The procedure 1200 then completes in step 1245.

While there has been shown and described illustrative embodiments of the present invention, it is to be understood that various other adaptations and modifications may be made within the spirit and scope of the invention. For example, the procedures, processes and/or modules described herein may be implemented in hardware, software, embodied as a computer-readable medium having program instructions, firmware, or a combination thereof. Therefore it is the object of the appended claims to cover all such variations and modifications as come within the true spirit and scope of the invention.

What is claimed is:

1. A system for revenue and expense realignment comprising:
    a computer operatively interconnected with one or more transaction servers; and
        a revenue and expense tracking system (RECAST) comprising:
        a web accessible graphical user interface to allow a user to enter one or more rows of data mappings, the one or more rows of data mappings selected from a group consisting of: a mapping type field, a fee type field, a received document type field, a received ledger field, a clearance ledger field, a revenue ledger field, and an accrual ledger field wherein the entered one or more rows of data mappings creating dynamically a set of user defined rules, and
        wherein the computer operatively interconnected to the one or more servers, executes a rules engine to:
            (i) receive a set of inbound transactions, the inbound transaction utilizing a first transaction format,
            (ii) convert the set of inbound transactions into a uniform transaction format to enable realignment of any type of vendor format, the conversion occurring using the set of previously entered rows of data mappings,
            (iii) perform the set of user defined rules based operations on the converted set of inbound transactions to generate a set of outbound transactions in the uniform transaction format,
            (iv) convert the set of outbound transactions from the uniform transaction format into a plurality of different outbound transaction formats, and
            (v) post the converted outbound transactions to one or more services.

2. The system of claim 1 wherein the RECAST further comprises an inbound interface module configured to convert a set of inbound transactions into a uniform transaction format.

3. The system of claim 1 wherein the RECAST further comprises an outbound interface module configured to convert a set of outbound transactions from a uniform transaction format into one or more outbound transaction formats.

4. The system of claim 1 wherein the RECAST further comprises a user interface module configured to provide a user interface to a client.

5. The system of claim 4 wherein the user interface is a graphical user interface and wherein the client accesses the graphical user interface using a web browser.

6. The system of claim 1 wherein the RECAST further comprises a statement builder that enables a user to construct the set of rules.

7. A system for revenue and expense realignment executed by a computer; the system comprising:
    means for entering, by a user on a web accessible graphical user interface, one or more rows of data mappings, the one or more rows of data mappings selected from a group consisting of: a mapping type field, a fee type field, a received document type field; a received ledger field, a clearance ledger field, a revenue ledger field, and an accrual ledger field wherein the entered one or more rows of data mappings creating dynamically a set of user defined rules;
    means for receiving a set of inbound transactions by a computer within a network operatively interconnected to one or more servers, the inbound transaction utilizing a first transaction format;
    means for converting the set of inbound transactions into a uniform transaction format to enable realignment of any type of vendor format, the conversion occurring using the set of previously entered rows of data mappings;
    means for performing the set of user defined rules based operations on the converted set of inbound transactions to generate a set of outbound transactions in the uniform transaction format;
    means for converting the set of outbound transactions from the uniform transaction format into a plurality of different outbound transaction formats; and
    means for posting the converted outbound transactions to one or more services.

8. The system of claim 7 wherein the set of inbound transactions comprise revenue transactions.

9. The system of claim 7 wherein the set of inbound transactions comprise expense transactions.

10. The system of claim 7 wherein the means for converting the set of inbound transactions into a uniform transaction format comprises means for completing one or more fields of the uniform transaction format using a set of reference data.

11. The system of claim 7 wherein the means for converting the set of inbound transactions into a uniform transaction format is performed using a set of user defined mappings.

* * * * *

UNITED STATES PATENT AND TRADEMARK OFFICE
CERTIFICATE OF CORRECTION

PATENT NO. : 7,654,445 B2  
APPLICATION NO. : 11/300028  
DATED : February 2, 2010  
INVENTOR(S) : John et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 551 days.

Signed and Sealed this

Twenty-eighth Day of December, 2010

David J. Kappos  
*Director of the United States Patent and Trademark Office*